(12) United States Patent
Kim

(10) Patent No.: US 9,734,253 B2
(45) Date of Patent: Aug. 15, 2017

(54) METHOD OF PROVIDING A WEBPAGE USING HOME DEVICE WEB BROWSER AND HOME DEVICE THEREFOR

(75) Inventor: Yongsin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 672 days.

(21) Appl. No.: 13/543,517

(22) Filed: Jul. 6, 2012

(65) Prior Publication Data
US 2013/0311873 A1   Nov. 21, 2013

(30) Foreign Application Priority Data

May 21, 2012 (KR) ........................ 10-2012-0053650

(51) Int. Cl.
| G06F 17/00 | (2006.01) |
| G06F 17/30 | (2006.01) |
| G06F 17/22 | (2006.01) |
| H04W 4/00 | (2009.01) |
| H04L 29/08 | (2006.01) |
| G06Q 10/10 | (2012.01) |

(52) U.S. Cl.
CPC .... *G06F 17/30876* (2013.01); *G06F 17/2235* (2013.01); *G06F 17/30905* (2013.01); *G06Q 10/109* (2013.01); *H04L 67/1095* (2013.01); *H04W 4/008* (2013.01)

(58) Field of Classification Search
CPC ........... G06F 17/2235; G06F 17/30876; G06F 17/30905; G06Q 10/109; H04L 67/1095; H04W 4/008
USPC .......................... 715/203–204, 206–207, 234
See application file for complete search history.

(56) References Cited

U.S. PATENT DOCUMENTS

| 7,398,277 B2 | 7/2008 | Lin | |
| 8,054,294 B2* | 11/2011 | Sakai et al. | 345/169 |
| 8,225,191 B1* | 7/2012 | Kalman | G06F 17/30873 715/201 |

(Continued)

OTHER PUBLICATIONS

"How do I keep my browser history in sync between multiple devices?", Aug. 31, 2010, https://www.quora.com/How-do-I-keep-my-browser-history-in-sync-between-multiple-devices, pp. 2.*

(Continued)

*Primary Examiner* — Chau Nguyen
(74) *Attorney, Agent, or Firm* — Birch, Stewart, Kolasch & Birch, LLP

(57) ABSTRACT

A method of providing a webpage on a home device web browser based on web browsing information of an external device connected via a network and device for the same are disclosed. The present invention includes displaying the home device web browser including a back button interface configured to guide an access change to a previously accessed URL (uniform resource locator) of a web browser, changing a URL access of the home device web browser in response to a user input to the back button interface, and displaying a webpage based on the changed URL access on the home device web browser, wherein the URL access change is performed based on a web browsing information of at least one external device connected with a home device via network and wherein the web browsing information includes a URL history information on a URL accessed by the web browser.

18 Claims, 12 Drawing Sheets

(56) References Cited

U.S. PATENT DOCUMENTS

| | | | | |
|---|---|---|---|---|
| 8,543,675 | B1* | 9/2013 | Yiu | G06F 3/0484 709/223 |
| 8,806,225 | B2* | 8/2014 | Park | G06F 21/74 713/165 |
| 2003/0195963 | A1* | 10/2003 | Song | H04L 67/142 709/227 |
| 2004/0162884 | A1 | 8/2004 | Jeon | |
| 2005/0132297 | A1* | 6/2005 | Milic-Frayling et al. | 715/745 |
| 2006/0069809 | A1* | 3/2006 | Serlet | 709/248 |
| 2007/0260751 | A1* | 11/2007 | Meesseman | G06Q 10/109 709/248 |
| 2008/0289029 | A1* | 11/2008 | Kim | G06F 17/30905 726/12 |
| 2009/0282169 | A1* | 11/2009 | Kumar | H04L 67/1095 709/248 |
| 2011/0055716 | A1* | 3/2011 | Kim | H04L 12/2814 715/740 |
| 2011/0154255 | A1* | 6/2011 | Ryu | H04W 4/008 715/810 |
| 2011/0208732 | A1* | 8/2011 | Melton et al. | 715/786 |
| 2011/0320450 | A1* | 12/2011 | Liu et al. | 707/737 |
| 2012/0096076 | A1* | 4/2012 | Chan | G06F 9/4856 709/203 |
| 2013/0014184 | A1* | 1/2013 | Mank | H04L 12/2809 725/80 |
| 2013/0254685 | A1* | 9/2013 | Batraski et al. | 715/760 |
| 2015/0215398 | A1* | 7/2015 | Chang | H04L 67/1095 726/8 |

OTHER PUBLICATIONS

Whitson Gordon, "How to Keep Your Workflow in Sync Across Computers", Sep. 15, 2010, http://lifehacker.com/5638130/how-to-keep-your-workflow-in-sync-across-computers, pp. 10.*

* cited by examiner

FIG. 8
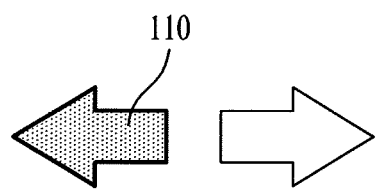
(a)
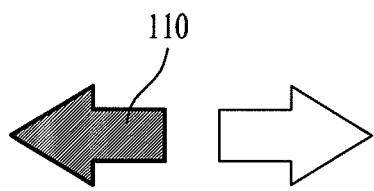
(b)
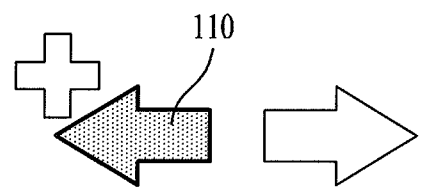
(c)

METHOD OF PROVIDING A WEBPAGE USING HOME DEVICE WEB BROWSER AND HOME DEVICE THEREFOR

Pursuant to 35 U.S.C. §119(a), this application claims the benefit of earlier filing date and right of priority to Korean Application No. 10-2012-0053650, filed on May 21, 2012, the contents of which are hereby incorporated by reference herein in their entirety.

BACKGROUND OF THE INVENTION

Field of the Invention

Embodiments of the present invention relate to a method of providing a webpage using a home device web browser and home device therefor, and more particularly, to a method of providing a webpage on a home device web browser based on web browsing information of an external device connected via a network and device for the same.

Discussion of the Related Art

Recently, as more devices capable of network communications are diversified, more devices capable of information search via web browser are diversified as well. For instance, a user may be able to use a web browser via one of a tablet PC, a portable device, a home device and the like as well as a conventional PC or laptop.

Thus, as more devices tend to be available in using a web browser, each of the devices may have individual web browsing information. However, a webpage found by a user using a web browser of a specific device is not easily accessible via a web browser of another device.

As more devices tend to be available in using a web browser, each of the devices may have individual web browsing information. However, a webpage found by a user using a web browser of a specific device is not easily accessible via a web browser of another device.

SUMMARY OF THE INVENTION

Accordingly, embodiments of the present invention are directed to a method of providing a webpage using a home device web browser and home device therefor that substantially obviate one or more of the problems due to limitations and disadvantages of the related art.

An object of the present invention is to provide a webpage providing method, by which a previously accessed webpage can be continuously accessed despite that a user changes a device for performing a web browsing. In particular, embodiments of the present invention relate to a webpage providing method for facilitating a user to access webpage information, on which the user has performed web browsing via a different device, via a currently used device. Specifically, one object of the present invention is to provide a method for a user to intuitively access a webpage page, which has been finally accessed via a different device, via a currently used device using a user interface of a previous web browser. Other objects of the invention also exist.

Technical tasks obtainable from embodiments of the present invention are non-limited the above-mentioned technical task. And, other unmentioned technical tasks can be clearly understood from the following description by those having ordinary skill in the technical field to which the present invention pertains.

Additional features and advantages of the embodiments of the invention will be set forth in the description which follows, and in part will be apparent from the description, or may be learned by practice of the embodiments of the invention. The objectives and other advantages of the embodiments of the invention will be realized and attained by the structure particularly pointed out in the written description and claims thereof as well as the appended drawings.

To achieve these and other advantages and in accordance with the purpose of the embodiments of the present invention, as embodied and broadly described, a method of providing a webpage using a home device web browser, according to one embodiment of the present invention may include the steps of displaying the home device web browser including a back button interface configured to guide an access change to a previously accessed URL (uniform resource locator) of a web browser, changing a URL access of the home device web browser in response to a user input to the back button interface, and displaying a webpage based on the changed URL access on the home device web browser, wherein the URL access change is performed based on a web browsing information of at least one external device connected with a home device via network and wherein the web browsing information includes a URL history information on a URL accessed by the web browser.

To further achieve these and other advantages and in accordance with the purpose of the embodiments of the present invention, a home device, which provides a webpage using a web browser according to another embodiment of the present invention may include a communication unit configured to transmit/receive data to/from at least one external device connected via network, a processor controlling an operation of the home device, and a display unit configured to output an image based on a command from the processor, wherein the processor controlling the display unit to display a home device web browser including a back button interface configured to guide an access change to a previously accessed URL (uniform resource locator) of a web browser, wherein the processor changes a URL access of the home device web browser in response to a user input to the back button interface, wherein the URL access change is performed based on a web browsing information of the at least one external device connected with the home device via the network, wherein the web browsing information includes a URL history information on a URL accessed by the web browser, and wherein the processor controls a webpage based on the changed URL access to be displayed on the home device web browser.

Effects obtainable from the embodiments of the present invention may be non-limited by the above mentioned effect. And, other unmentioned effects can be clearly understood from the following description by those having ordinary skill in the technical field to which the embodiments of the present invention pertain.

It is to be understood that both the foregoing general description and the following detailed description of the embodiments of the present invention are exemplary and explanatory and are intended to provide further explanation of the invention as claimed.

BRIEF DESCRIPTION OF THE DRAWINGS

The accompanying drawings, which are included to provide a further understanding of the embodiments of the invention and are incorporated in and constitute a part of this application, illustrate embodiment(s) of the invention and together with the description serve to explain the principle of the embodiments of the invention. In the drawings:

FIG. 8 is a diagram for a method of displaying a back button interface on a home device web browser according to an embodiment of the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First of all, although general terminologies used currently and widely are selected as terminologies used in this specification, they may be changeable in accordance with at least one of an intention of a professional in the field to which the present invention belongs, the custom in the field, an advent of a new technique and the like. In specific case, a terminology may be arbitrarily selected by a user, for which the meaning of the selected terminology shall be indicated in the detailed description of the embodiments of this invention. Therefore, terminologies used in this specification should be construed as substantial meanings rather than simple names of the terminologies on the basis of overall contents included in this specification.

Figure 1:
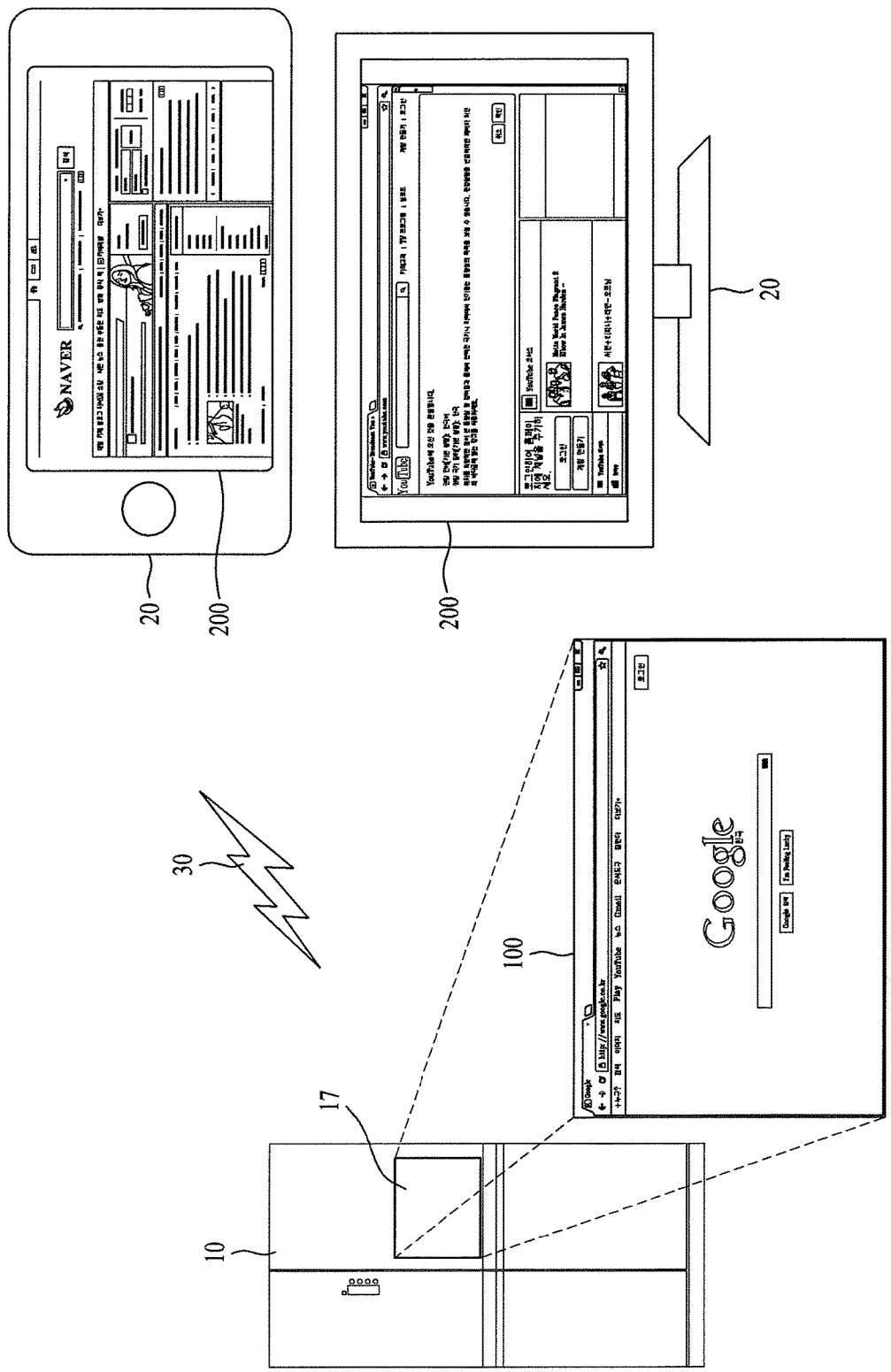
FIG. 1 is a diagram of a network system including a home device according to an embodiment of the present invention.

FIG. 1 is a diagram of a network system including a home device according to one embodiment of the present invention.

Referring to FIG. 1, a network system may include a home device 10 according to one embodiment of the present invention, at least one external device 20 and a network 30 connecting the home device 10 and the at least one external device 20 with each other by wire/wireless.

The home device 10 may include a display unit 17 and various electronic devices having communication units (not shown in the drawing). For instance, the home device 10 may include one of a PC, a PDA (personal digital assistant), a notebook computer, a tablet PC and the like. For another instance, the home device 10 may include a home appliance corresponding to one of a television set, a refrigerator, a washer, an microwave range and the like, each of which includes a display unit 17 and a communication unit. For further instance, the home device 10 may include one of various electronic devices capable of image display and data communications. Besides, the home device 10 of embodiments of the present invention may include such a device capable to controlling an image display of a separate display device by being connected with the separate display device via network or cable as a settop box, a router and the like.

The home device 10 according to the embodiment of the present invention may be able to activate a web browser 100 by being linked with a network and may be able to control the web browser 100 to be displayed on the display unit 17. In this specification, the web browser 100 activated on the home device 10 shall be named a home device web browser 10.

Meanwhile, the external device 20 is a sort of an electronic device including a display unit and a communication unit as well. And, the external device 20 may be able to activate a corresponding web browser 200 by being linked with the network. According to one embodiment of the present invention, the external device 20 may include one of various electronic devices each of which is capable of image display and data communications.

Each of the home device 10 and the external device 20 may communicate with external environment using various protocols. Through this, the home device 10 and the external device 20 may be able to activate web browsers 100 and 200, respectively. Each of web browsers 100 and 200 may access a specific resource connected via the network using URL (uniform resource locator) and may be able to display a webpage of the corresponding resource. When a web browsing job is performed via the web browser 100/200, a web browsing information is generated from each of web browsers 100 and 200. In this case, the web browsing information may contain URL history information on the URL accessed by the corresponding web browser. In particular, the web browsing information may contain the URL history information on accesses in period ranging between a timing point of the activation of the corresponding web browser and a timing point of a final job. And, the web browsing information may be reset when the corresponding web browser is disabled. Each of web browsers 100 and 200 may include a back button interface and a forward button interface. If the back button interface or the forward button interface is manipulated, as known to the public, a resource previously accessed by the corresponding web browser may be accessed again. In particular, based on the web browsing information of the corresponding web browser, a user may be able to perform an access change in a manner of accessing a URL accessed right previous to a currently accessed URL via the back button interface or accessing a URL accessed right next to a currently accessed URL via the forward button interface. As the access URL of the web browser is changed by an input to the back or forward button interface, the corresponding web browser may be able to display a webpage based on the access-changed URL.

Meanwhile, according to an embodiment of the present invention, the network 30 may include one of wire/wireless networks of various types to enable the home device 10 to communicate with the external devices 20. In this case, the available wireless networks may include NFC (near field communication), Zigbee, IR communication, Bluetooth, Wi-Fi and the like, by which embodiments of the present invention may be non-limited. The communication between the home device 10 and the external device 20 may be established using one of the above-enumerated networks 30 or a combination thereof.

Figure 2:
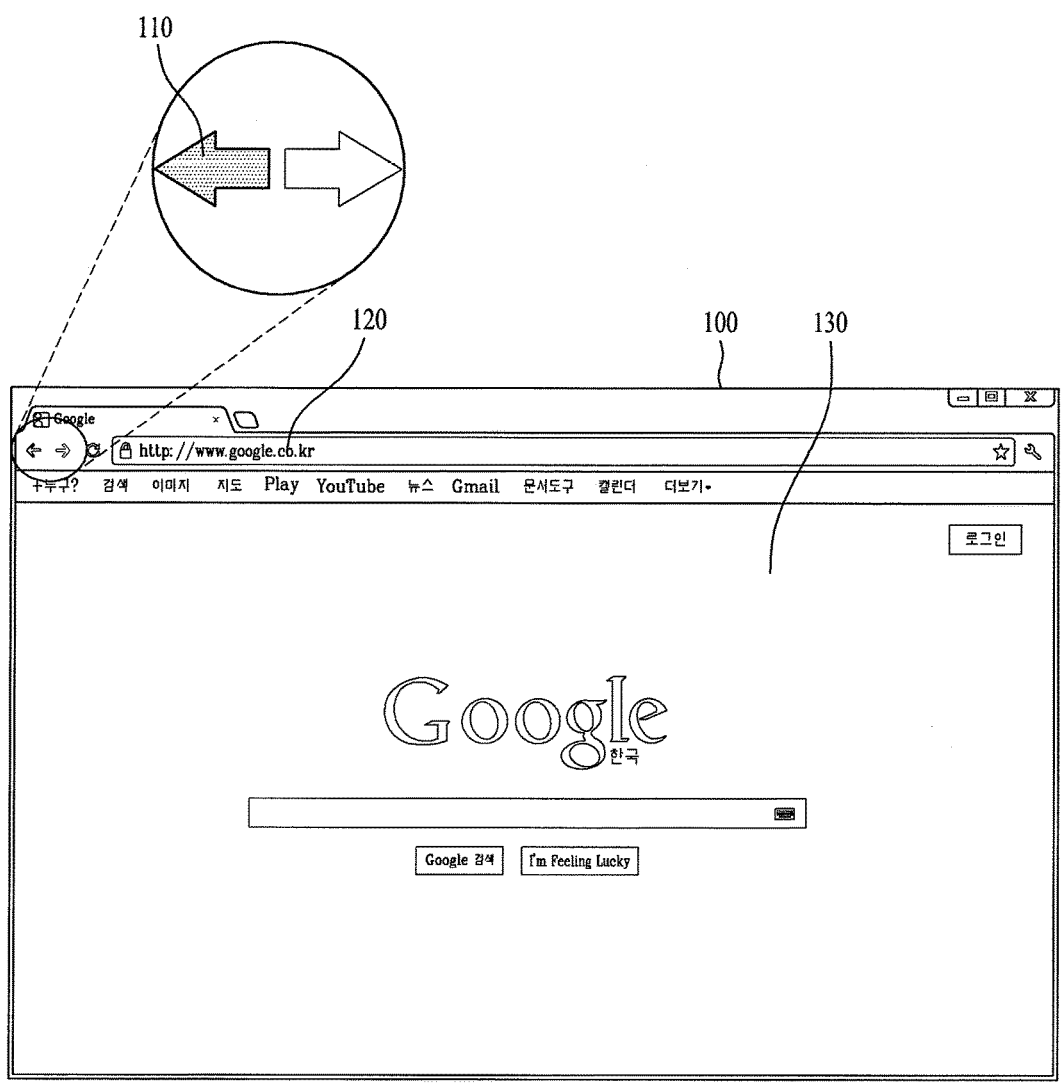
FIG. 2 is a diagram of a home device web browser according to an embodiment of the present invention.
Figure 3:
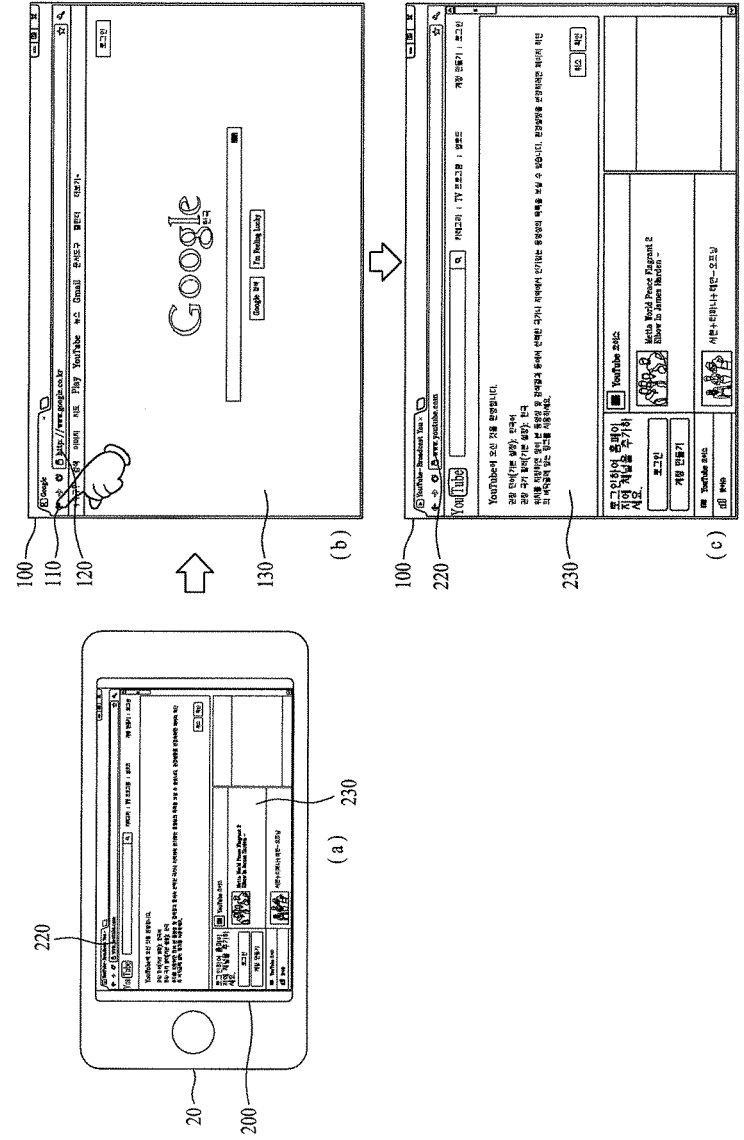
FIG. 3 and FIG. 4 are diagrams for a method of performing a URL access change in response to a user input to a back button interface of a home device web browser according to an embodiment of the present invention.
Figure 4:
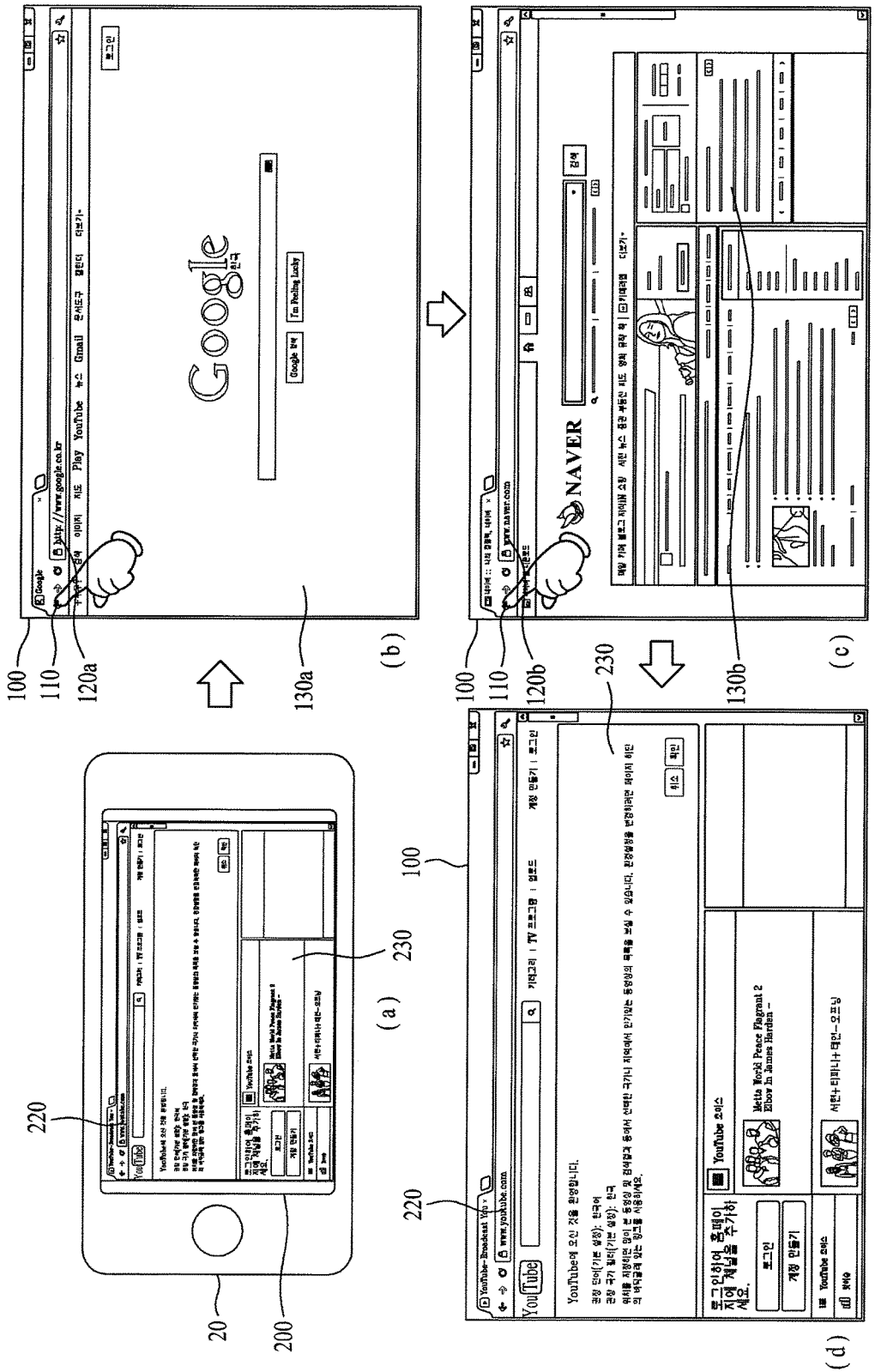

FIGS. 2 to 4 show a home device web browser 100 according to an embodiment of the present invention and web browsing embodiments using the home device web browser 10.

FIG. 2 is a diagram of a home device web browser 100 according to an embodiment of the present invention.

Referring to FIG. 2, the home device web browser 100 may display a webpage 130 based on a currently accessed URL 120. And, the home device web browser 100 includes a back button interface 110. In this case, the back button interface 110 is the interface configured to guide an access change into a previously accessed URL of the home device web browser 100. According to one embodiment of the present invention, the back button interface 110 of the home device web browser 100 may be able to guide a URL access change based on a web browsing information of an external device.

FIG. 3 shows a scene of performing a URL access change using a back button interface 110 of a home device web browser 100 according to one embodiment of the present invention.

Referring to FIG. 3, in response to a user input to the back button interface 110, the home device web browser 100 may be able to perform a URL access change based on a web browsing information of an external device 20. In particular, a URL 220 accessed by a user via a web browser 200 of the external device 20 is accessed via an input to the back button interface 110 of the home device web browser 100.

First of all, if a user performs a web browsing using the web browser 200 of the external device 20, a web browsing information is generated from the external device 20. In this case, the web browsing information may contain URL history information on URL(s) having been accessed by the web browser 200, and more particularly, URL information on a URL finally accessed by the web browser 200. The web browsing information of the external device 20 may be transmitted to a home device via a network. And, the user may be able to perform a URL access change based on the web browsing information of the external device 20.

According to one embodiment of the present invention, the back button interface 110 provided to the home device web browser 100 may be able to guide a URL access change based on the web browsing information of the external device 20. In particular, if a user input to the back button interface 110 on the home device web browser 100 is received, the home device web browser 100 may be able to perform a URL access change based on the web browsing information of the external device 20 in response to the received user input. In doing so, the home device web browser 100 may be able to display a webpage based on the changed URL access. According to an embodiment of the present invention, the home device web browser 100 may be able to perform an access change to the URL 220 finally accessed by the web browser 200 of the external device 20 in response to an initial user input to the back button interface 100. Moreover, in response to a future user input to the back button interface 110, the home device web browser 100 may be able to perform a URL access change based on the web browsing information of the external device 20. In doing so, the home device web browser 100 may be able to perform the URL access change in order of recently accessed URL based on a web browsing history of the web browser 200 of the external device 20.

According to the embodiment shown in FIG. 3, after a user has accessed a specific URL 220 via the web browser of the external device 20, the web browsing may continue via the home device web browser 100 [FIG. 3 (a)]. The home device web browser 100 displays a webpage 130 based on the currently accessed URL 120, as shown in FIG. 3 (b). If a user input to the back button interface 100 on the home device web browser 100 is received, the URL access is changed. In doing so, referring to FIG. 3 (c), the home device web browser 100 may be able to change the URL access to the URL 220 finally accessed by the web browser 200 of the external device 20 and may be able to display a webpage 230 based on the changed URL 220.

FIG. 4 shows a process for performing a URL access change using a back button interface 110 of a home device web browser 100 according to another embodiment of the present invention.

Referring to FIG. 4, in case that a URL access change based on a web browsing information of the home device web browser 100 is not available, the back button interface 110 of the home device web browser 100 may be able to guide a URL access change based on a web browsing information of an external device 20. In particular, in response to a user input to the back button interface 110, an access change to a previously accessed URL of the home device web browser 100 is preferentially performed. If the URL access change based the web browsing information of the home device web browser 100 is not available, the URL access change may be performed using the web browsing information of the external device 20.

For instance, when there is a history of web browsing performed by a user using the home device web browser 100, the home device web browser 100 may be able have web browsing information of its own. In this case, if the URL access change based on the web browsing information of the home device web browser 100 is available for the home device web browser 100, the home device web browser 100 may be able to perform the URL access change based on the web browsing information of its own in response to a user input to the back button interface 110. Referring to FIG. 4, while the home device web browser 100 displays a webpage 130a based on a currently accessed URL 120a, an access change to a URL previously accessed by the home device web browser 100 may be available for the home device web browser 100 [FIG. 4 (b)]. In doing so, if a user input to the back button interface 110 is received, the home device web browser 100 may be able to perform an access change to a previously accessed URL 120b based on the web browsing information of its own [FIG. 4 (c)]. Moreover, the home device web browser 100 may be able to display a webpage 130b based on the access changed URL 120b.

Meanwhile, if a URL access change based on the web browsing information of the home device web browser 100 is not available for the home device web browser 100, the home device web browser 100 may be able to perform a URL access change based on the web browsing information of the external device 20 in response to a user input to the back button interface 110. If the URL access change based on the web browsing information of the home device web browser 100 is not available for the home device web browser 100, it may correspond to one of a case i) that a web browsing history after activation of the home device web browser 100 does not exist and a case ii) that a web browsing information of a home device supposed to perform a URL access change in response to at least one user input to the back button interface 110 becomes exhausted. Referring to FIG. 4, an access change to a URL previously accessed by the home device web browser 100 may not be available for the home device web browser 100 which is displaying a webpage 130b based on a currently accessed URL 120b, [FIG. 4 (c)]. In doing so, if a user input to the back button interface 110 is received, the home device web browser 100 may be able to perform an access change to a URL 220 based on the web browsing information of the external device 20 [FIG. 4 (d)]. Moreover, the home device web browser 100 may be able to display a webpage 230 based on the access changed URL 220.

Figure 5:
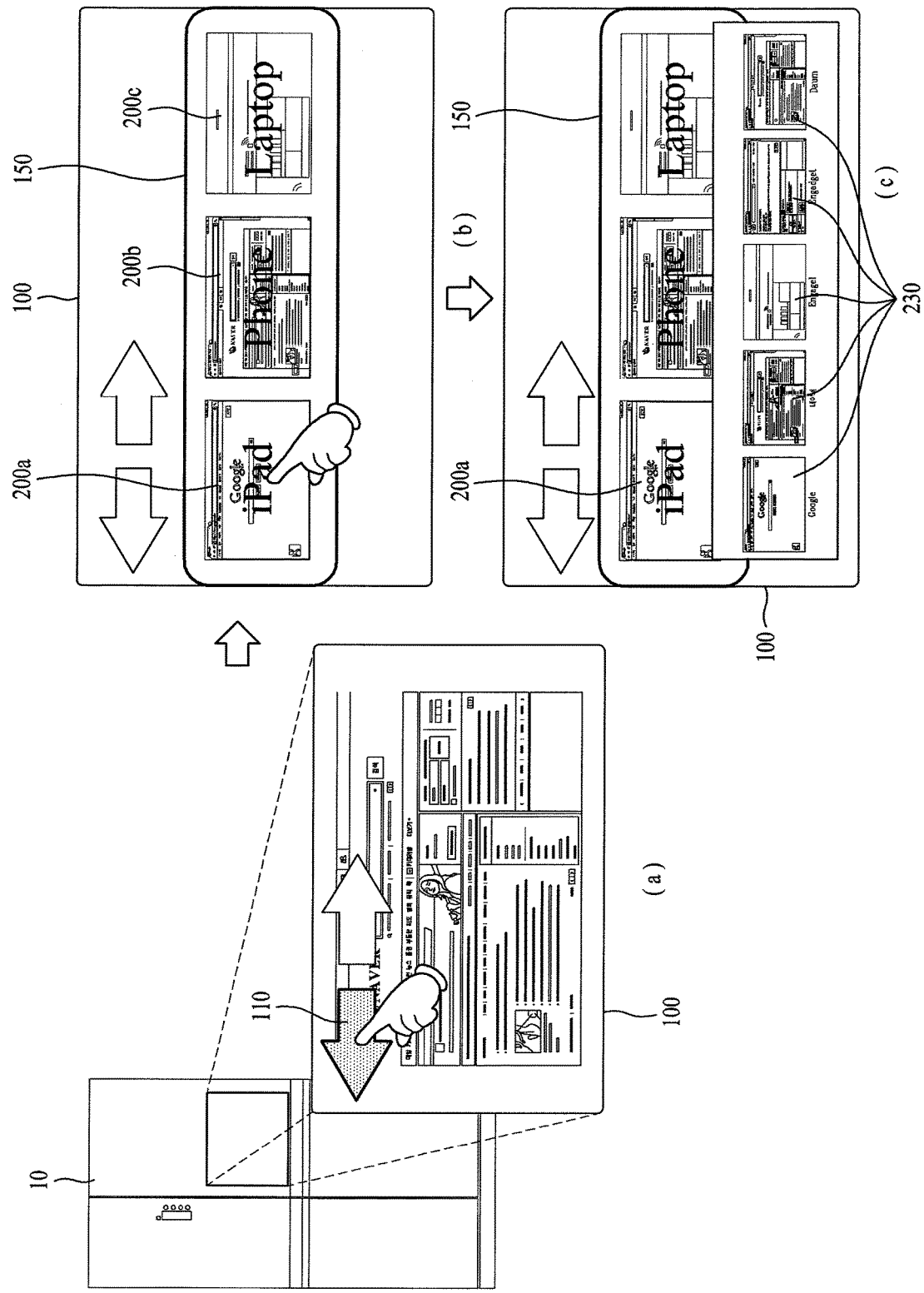
FIGS. 5 to 7 are diagrams for a method of performing a URL access change in response to a user input to a back button interface of a home device web browser when at least two external devices have web browsing informations according to another embodiment of the present invention.
Figure 6:
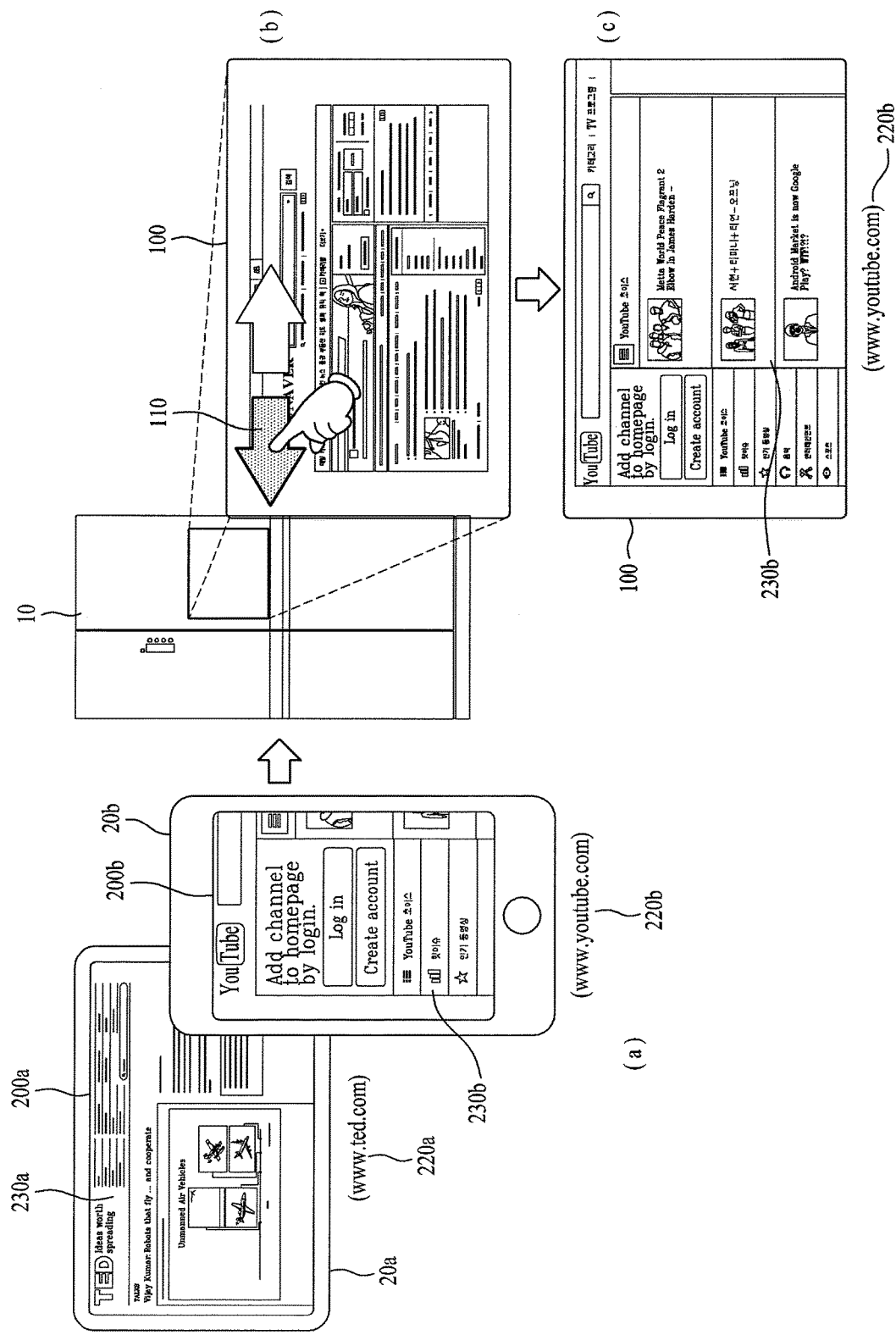
Figure 7:
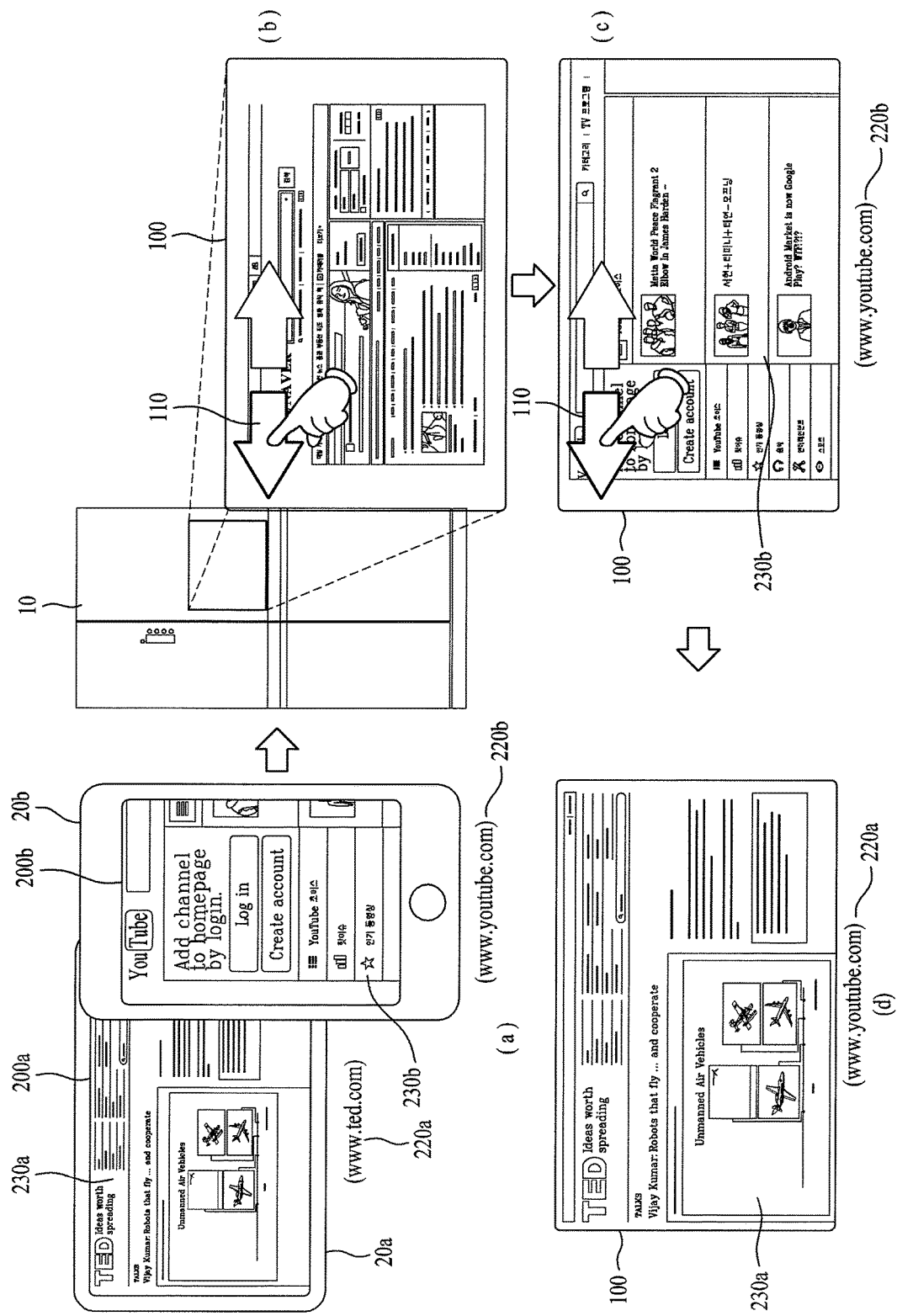

FIGS. 5 to 7 are diagrams for a method of performing a URL access change in response to a user input to a back button interface of a home device web browser when at least two external devices have web browsing informations according to another embodiment of the present invention.

Referring to FIG. 5, in case that at least two external devices connected via network have web browsing informations, the home device web browser 100 may be able to provide a list interface 150 in response to a user input to the back button interface 110. In particular, the list interface 150 is the interface configured to select a prescribed device from the at least two external devices having the web browsing informations. According to an embodiment of the present invention, the home device web browser 100 may be able to change a URL access using the web browsing information of the external device selected via the list interface 150.

In particular, referring to FIG. 5 (a), if a user input to the back button interface 110 of the home device web browser 100 is received, the home device web browser 100 may be able to provide the list interface 150. Referring to FIG. 5 (b), the list interface 150 may be able to represent web browsers 200a, 200b and 200c having web browsing informations in a list or another shape. Alternatively, the list interface 150 may be able to represent the external devices having the web browsing informations in an icon or text type list. The list interface 150 may be displayed on the home device web browser 100. And, the web browsers 200a, 200b and 200c of the external devices represented by the list interface 150 may display webpages based on final URLs accessed by the web browsers, respectively.

According to the embodiment shown in FIG. 5 (b), if a user selects the $1^{st}$ external device web browser 200a from a plurality of the external device web browsers displayed on the list interface 150, i.e., from the $1^{st}$ to $3^{rd}$ external device web browsers 200a, 200b and 200c, the home device web browser 100 may be able to perform a URL access change based on the web browsing information of the selected $1^{st}$ external device web browser 200a. According to the embodiment of the present invention, the home device web browser 100 may be able to perform a URL access change to a finally accessed URL of the selected $1^{st}$ external device web browser 200a. On the other hand, according to another embodiment of the present invention, if a user selects one of the external device web browsers 200a, 200b and 200c displayed on the list interface 150, the home device web browser 100 may be able to represent the webpages, which are based on the web browsing information of the selected external device web browser, in a list or another configuration. For instance, if a user selects the $1^{st}$ external device web browser 200a via the list interface 150 [FIG. 5 (b)], the home device web browser 100 may be able to enumerate a plurality of webpages 230 corresponding to a plurality of URLs accessed by the $1^{st}$ external device web browser 200a [FIG. 5 (c)]. In doing so, the user may be able to select a prescribed web page from the enumerated webpages 230. And, the home device web browser 100 may be able to perform an access change to the URL corresponding to the selected webpage.

FIG. 6 shows a process for providing a webpage via a home device web browser in case that at least two external devices connected via network have web browsing informations according to another embodiment of the present invention.

Referring to FIG. 6, in response to a user input to the back button interface 110, the home device web browser 100 may be able to perform a URL access change based on the web browsing information of the external device having a latest final URL access executing time among the at least two external devices 20a and 20b. In particular, the home device web browser 100 may be able to preferentially use the web browsing information of the external device, which has performed the URL access most recently, for the URL access change.

For instance, referring to FIG. 6 (a), a user may be able to perform a web browsing via web browsers of at least two external devices, and more particularly, via a web browser 200a of the $1^{st}$ external device 20a and a web browser 200b of the $2^{nd}$ external device 20b. The $1^{st}$ external device web browser 200a and the $2^{nd}$ external device web browser 200b may be able to display webpages 230a and 230b based on finally accessed URLs 220a and 220b, respectively. According to one embodiment of the present invention, the user may be able to access the URL 220a accessed by the external device web browser 200a and the URL 220b accessed by the external device web browser 200b via the home device web browser 100 activated in the home device 10. In particular, referring to FIG. 6 (b), if a user performs an input to the back button interface on the home device web browser 100, the home device web browser 100 may be able to perform a URL access change based on at least one web browsing information of the external device web browsers 200a and 200b.

According to an embodiment of the present invention, the home device web browser 100 may be able to perform a URL access change based on the web browsing information of the external device having a latest final URL access executing time among the at least two external devices 20a and 20b. For instance, a user performs the web browsing via the web browser 220a of the $1^{st}$ external device 20a shown in FIG. 6 (a) and may be then able to perform the web browsing via the web browser 220b of the $2^{nd}$ external device 20b. Thereafter, if the user continues the web browsing via the home device web browser 100, an access time of the URL (www.youtube.com) 220b finally accessed via the web browser 220b of the $2^{nd}$ external device 20b may be behind an access time of the URL (www.ted.com) 220a finally accessed via the web browser 220a of the $1^{st}$ device 20a. In doing so, if the user performs an input to the back button interface 110 of the home device web browser 100 [FIG. 6 (b)], the home device web browser 100 may perform an access change to the URL (www.youtube.com) 220b finally accessed via the web browser 220b of the $2^{nd}$ external device 20b [FIG. 6 (c)]. Moreover, the home device web browser 100 may be able to display a webpage 230b based on the URL 220b on which the access change has been performed.

FIG. 7 shows a process for providing a webpage via a home device web browser in case that at least two external devices connected via network have web browsing informations according to another embodiment of the present invention.

Referring to FIG. 7, in response to a continuous user input to the back button interface 110, the home device web browser 100 may be able to perform a URL access change based on web browsing information of a corresponding external device in order of an external device having a late time of executing a final URL access. In particular, the home device web browser 100 preferentially uses the web browsing information of the external device having performed a URL access most recently for the URL access change. In case that the URL access change using the web browsing information of the corresponding external device in response to the continuous user input to the back button interface 110 is not further available, the home device web browser 100 may be able to use a web browsing information of a different external device. In this case, the web browsing information of the different external device may include the web browsing information of the external device having performed the URL access most recently among the rest of the external devices except the external device used for the URL access change of the home device web browser 100.

For instance, after a user has performed the web browsing via the web browser 220a of the 1$^{st}$ external device 20a shown in FIG. 7 (a), the user may be able to perform the web browsing via the web browser 220b of the 2$^{nd}$ external device 20b. Thereafter, if the user continues the web browsing via the home device web browser 100, an access time of the URL (www.youtube.com) 220a finally accessed via the web browser 220b of the 2$^{nd}$ external device 20b may be behind an access time of the URL (www.ted.com) 220a finally accessed via the web browser 220a of the 1$^{st}$ device 20a. In doing so, if the user performs an input to the back button interface 110 of the home device web browser 100 [FIG. 7 (b)], the home device web browser 100 may be able to preferentially perform an access change to the URL (www.youtube.com) 220b finally accessed via the web browser 220b of the 2$^{nd}$ external device 20b [FIG. 7 (c)]. Moreover, the home device web browser 100 may be able to display a webpage 230b based on the URL 220b on which the access change has been performed.

On the other hand, after the access change to the URL 220b has been performed, if the user input to the back button interface 110 continues, the home device web browser 100 may be able to keep performing the URL access change based on the web browsing information of the 2$^{nd}$ external device 20b. If the web browsing information of the 2$^{nd}$ external device 20b, on which an access change will be performed by the user input to the back button interface 110, is exhausted, the home device web browser 100 may be able to perform the URL access change based on the web browsing information of the 1$^{st}$ external device 20a. Hence, referring to FIG. 7 (d), the home device web browser 100 may be ale to perform the access change to the URL (www.ted.com) 220a finally accessed via the web browser 220a of the 1$^{st}$ device 20a. Moreover, the home device web browser 100 may be able to display a webpage 230a based on the URL 220a on which the access change has been performed.

According to another embodiment of the present invention, in response to a continuous user input to the back button interface 110, the home device web browser 100 may be able to perform a URL access change in order of URL most recently accessed among web browsing informations of all external devices connected via network. In particular, the home device web browser 100 may be able to perform the access change to the corresponding URL in order of an external device having a late time of executing an access among web browsing informations of at least one or more external devices, which are received by the home device 10. Even if a user performs the web browsing via at least two external devices, the home device web browser 100 may be able to perform the access change to the corresponding URL in reverse order of the URL access executed time irrespective of the external device having performed the URL access, in response to the continuous user input to the back button interface 110.

FIG. 8 is a diagram for a method of displaying a back button interface on a home device web browser according to one embodiment of the present invention.

Referring to FIG. 8, according to one embodiment of the present invention, a home device web browser enables a back button interface 110 to have a different display attribute by depending on a fact that the back button interface 110 guides a URL access change based on a web browsing information of a specific device. In particular, regarding a 1$^{st}$ state that the back button interface 110 guides a URL access change based on a web browsing information of a home device and a 2$^{nd}$ state that the back button interface 110 guides a URL access change based on a web browsing information of an external device, the home device web browser 100 may be able to control the back button interface 110 in the 1$^{st}$ state and the back button interface 110 in the 2$^{nd}$ state to differ from each other in display attribute. In an embodiment of the present invention, the display attribute of the back button interface 110 may include at least one of a color, shape, brightness, pattern and transparency of the back button interface 110. Alternatively, an effect of displaying a separate icon on the back button interface 110 may be provided as the display attribute of the back button interface 110.

For instance, in case that the back button interface 110 in the 1$^{st}$ state is displayed [FIG. 8 (a)], the back button interface 110 in the 2$^{nd}$ state may be displayed in a manner of differing in color [FIG. 8 (b)] or a separate icon may be additionally displayed around the back button interface 110 [FIG. 8 (c)]. According to an embodiment of the present invention, the back button interface 110 is activated in both of the 1$^{st}$ state and the 2$^{nd}$ state. And, the home device web browser 100 may e able to differentiate the display attribute of the back button interface 110 in each of the states. In doing so, the display state of the back button interface 110 in the 1$^{st}$ state may be set identical to that of a back button interface activated in a general web browser.

In order to control the back button interface 110 in the 1$^{st}$ state and the back button interface 110 in the 2$^{nd}$ state to differ from each other in display attribute, the home device web browser may receive a web browsing information of an external device connected via network. According to one embodiment of the present invention, this web browsing formation may be received in case of activating the home device web browser. Alternatively, the web browsing information may be received in case that the web browsing information of the home device, on which a URL access change will be performed in response to a user input to the back button interface 110, is exhausted. According to another embodiment of the present invention, the web browsing information of the external device may be received in response to a user input to the back button interface 110. In doing so, the home device web browser may be able to check whether there is a web browsing information of an external device updated in case of receiving the user input to the back button interface 110. If the updated web browsing information of the external device exists, it may be received.

Thus, in a manner of controlling the back button interface 110 in the 1$^{st}$ state and the back button interface 110 in the 2$^{nd}$ state to differ from each other in display attribute, when a user performs an input to the back button interface 110 on the home device web browser, the user may be able to predict whether a URL access will be changed based on a web browsing information of a specific device.

Figure 9:
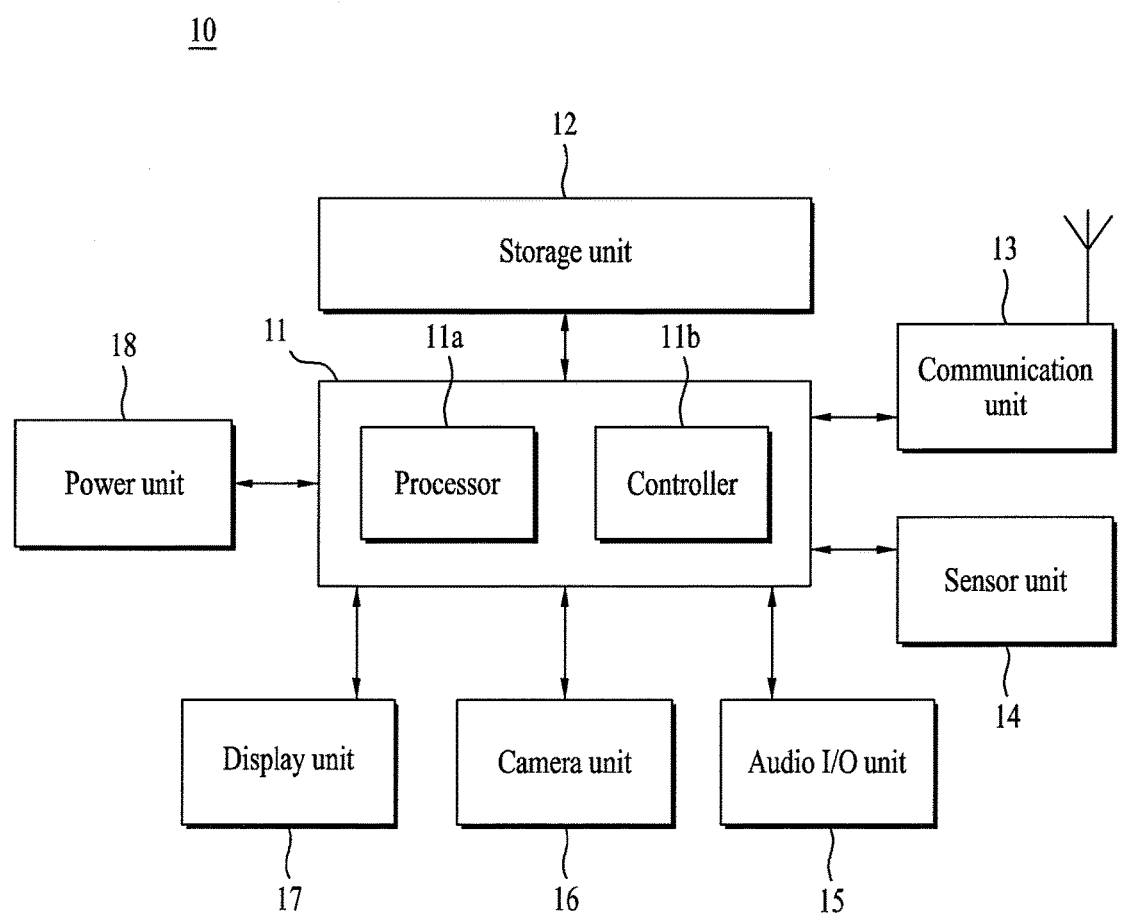
FIG. 9 is a block diagram of a home device according to an embodiment of the present invention.

FIG. 9 is a block diagram of a home device according to one embodiment of the present invention.

Referring to FIG. 9, a home device 10 according to an embodiment of the present invention may include a processor 11 (optionally including a processor subunit 11a and a controller subunit 11b), a storage unit 12, a communication unit 13, a sensor unit 14, an audio I/O (input/output) unit 15, a camera unit 16, a display unit 17, a power unit 18 and the like.

The storage unit 12 of an embodiment of the present invention may store various digital data of videos, audios, photos, moving images, applications and the like. The storage unit 12 may include such a digital data storage space as a flash memory, an HDD (hard disk drive), an SSD (solid state drive) and the like.

The communication unit 13 may be able to transmit or receive data by performing communications with a home device using various protocols. The communication unit 13 accesses a network by wire/wireless and then transmits or receives digital data.

The sensor unit 14 may be able to deliver a user input or an environment recognized by a device to the controller subunit 11b using a plurality of sensors loaded on the home device 10. In doing so, the sensor unit 14 may include a plurality of sensing means. For example, a plurality of the sensing means may include a gravity sensor, a geomagnetic sensor, a motion sensor, a gyro sensor, an acceleration sensor, an inclination sensor, a brightness sensor, an altitude sensor, an odorant sensor, a temperature sensor, a depth sensor, a pressure sensor, a bending sensor, an audio sensor, a video sensor, a GPS (global positioning system) sensor, a touch sensor and the like. The sensor unit 14 is a common name for one of various sensing means mentioned in the above description. And, the sensor unit 14 senses various user inputs and user's environment and may be then able to deliver a sensing result to enable the home device 10 to perform a corresponding operation. The above-mentioned sensors may be included as separate elements in the home device 100. Alternatively, the above-mentioned sensors may be included in the home device 10 in a manner of being integrated into at least one or more elements. Besides, according to one embodiment of the present invention, the sensor unit 14 may be optionally provided to the home device 10.

The audio I/O (input/output) unit 15 may include an audio output means such as a speaker and the like and an audio input means such as a microphone and the like. According to one embodiment of the present invention, the audio I/O unit 15 may be optionally provided. The audio I/O unit 15 may perform an audio output of the home device 10 and an audio input to the home device 10 and may be usable as an audio sensor.

The camera unit 16 may play a role in photographing a photo and video. According to one embodiment of the present invention, the camera unit 16 may be optionally provided. And, the camera unit 1 may be usable as a motion sensor or a visual sensor mentioned in the foregoing description.

The display unit 17 may output an image to a display screen. The display unit 17 may be able to output an image based on an application activated in the processor subunit 11a or a control command of the processor subunit 11a. According to one embodiment of the present invention, in case that the display unit 17 includes a touch sensitive display, it may be usable as the aforementioned touch sensor. According to another embodiment of the present invention, the home device 10 may include a display control unit (not shown in the drawing). In particular, the display control unit may control an image to be outputted via a separate display unit connected to the home device 10.

The power unit 18 is a power source connected to a battery within the device or an external power supply and may supply a power to the home device 10.

The processor subunit 11a may activate various applications saved in the storage unit 12 and may be able to process data within the device. And, the controller subunit 11b may control the above-mentioned units of the device and may be able to control data transmissions and receptions among the units.

According to an embodiment of the present invention, the processor subunit 11a and the controller subunit 11b may be integrated into a single chip and may be then able to perform the above-described respective operations together. Thus, the processor may include a processor 11 configured in a manner that a processor subunit 11a and a controller subunit 11b are integrated into one chip.

As described above, FIG. 9 is a block diagram of the home device 10 according to one embodiment of the present invention, in which elements of the device are logically discriminated as blocks, respectively. Therefore, the above-described elements of the device may be implemented into one chip or a plurality of chips and then loaded on the device, in accordance with a design of the device.

Figure 10:
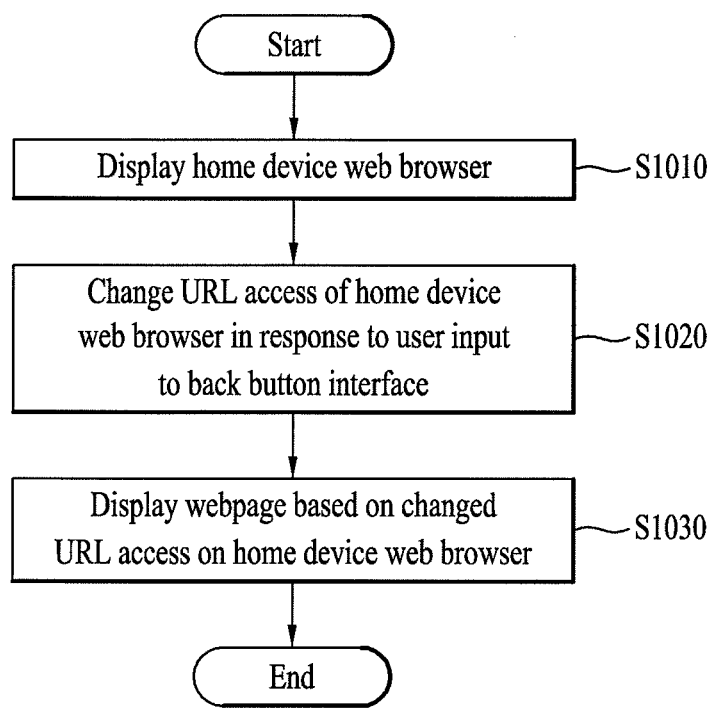
FIG. 10 is a flowchart for a webpage providing method using a home device web browser according to an embodiment of the present invention.

FIG. 10 is a flowchart for a webpage providing method using a home device web browser according to one embodiment of the present invention. According to an embodiment of the present invention, the processor 11 shown in FIG. 9 may be able to control an operation of each step described with reference to FIG. 10.

Referring to FIG. 10, according to one embodiment of the present invention, a home device may display a home device web browser [S1010]. In particular, the home device web browser may be displayed on a display unit of the home device and its operations may be controlled by a processor of the home device. The home device web browser may include a back button interface. In this case, the back button interface is the interface configured to guide an access change to a URL previously accessed by a web browser. As mentioned in the foregoing description, according to one embodiment of the present invention, the home device web browser may enable the back button interface to have a different display attribute by depending on a fact that the back button interface guides a URL access change based on a web browsing information of a specific device. In particular, regarding a $1^{st}$ state that the back button interface 110 guides a URL access change based on a web browsing information of a home device and a $2^{nd}$ state that the back button interface 110 guides a URL access change based on a web browsing information of an external device connected via network, the home device web browser may be able to control the back button interface in the $1^{st}$ state and the back button interface in the $2^{nd}$ state to differ from each other in display attribute.

Subsequently, the home device may be able to change a URL access of the home device web browser in response to a user input to the back button interface [S1020]. According to one embodiment of the present invention, in case that the URL access change based on the web browsing information in response to the user input to the back button interface is available, the home device web browser may be able to preferentially perform the URL access change based on its web browsing information. On the contrary, if the URL access change based on the web browsing information of the home device web browser is not available, the home device web browser may be able to perform the URL access change based on the web browsing information of the external device connected via network in response to the user input to the back button interface.

Meanwhile, according to one embodiment of the present invention, at least two external devices connected with the home device via network may have web browsing informations. And, the home device web browser may be able to provide a list interface configured to select one of the at least two external devices in response to a user input to the hack button interface. In particular, the list interface may represent the external devices having the web browsing informations as a list. And, a user may be able to select a prescribed external device from the list interface. The home device web browser may be able to perform a URL access change based on web surfing information of the external device selected via the list interface 150.

Moreover, according to another embodiment of the present invention, in response to a user input to the back button interface, the home device web browser may be able to perform a URL access change based on web browsing information of an external device having a late time of executing a final URL access among the at least two external devices. In case that the URL access change using the web browsing information of the corresponding external device in response to the continuous user input to the back button interface is not further available, the home device web browser may be able to perform a URL access change based on a web browsing information of a different external device. In this case, the web browsing information of the different external device may include the web browsing information of the external device having a late time of executing the final URL access among the rest of the external devices except the external device used for the URL access change of the home device web browser.

Like the above embodiment, if the home device web browser performs the URL access change in response to the user input to the back button interface, the home device may be able to display a webpage based on the changed URL access on the home device web browser [S1030].

Figure 11:
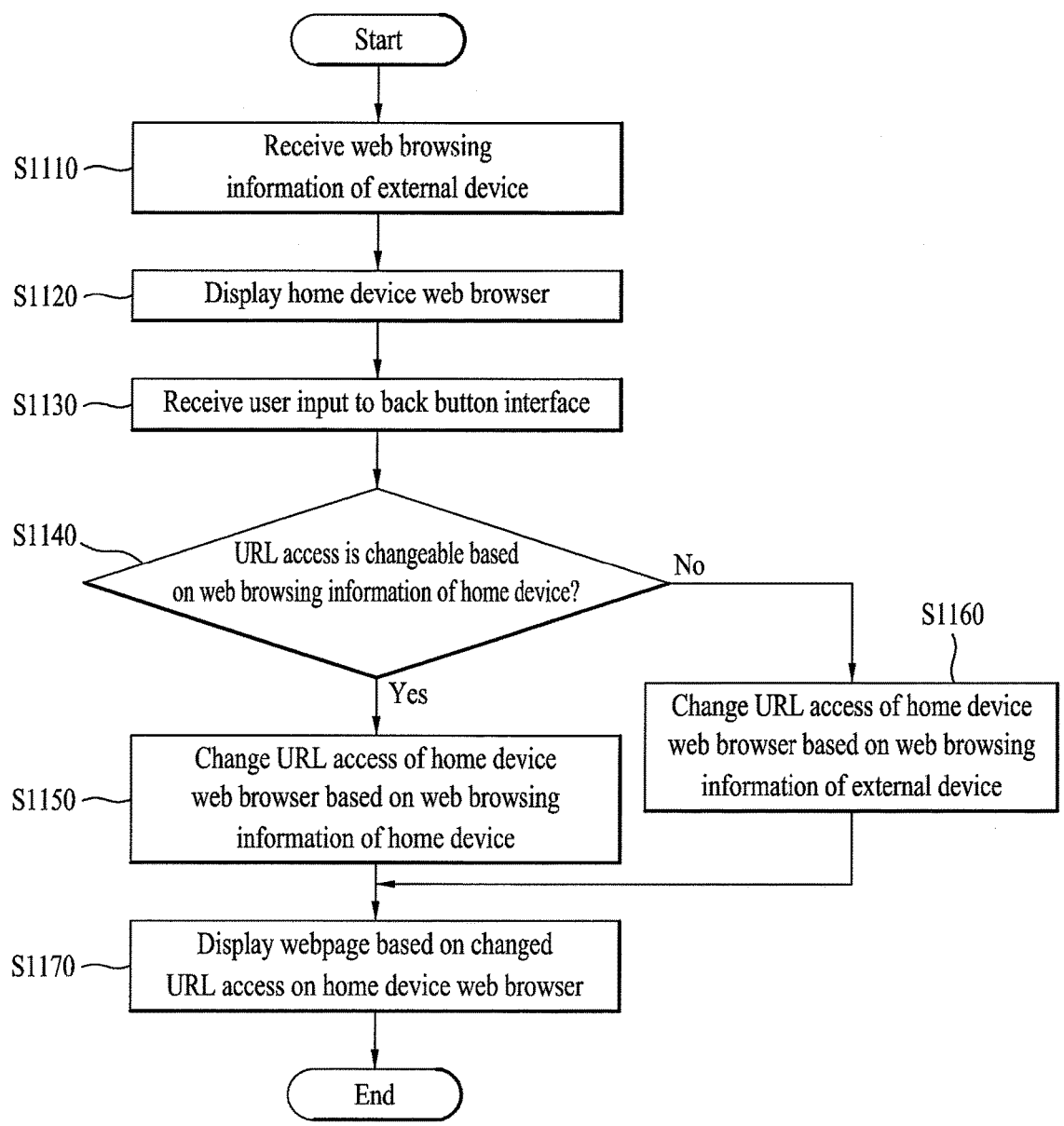
FIG. 11 and FIG. 12 are flowcharts for a webpage providing method using a home device web browser according to another embodiment of the present invention.
Figure 12:
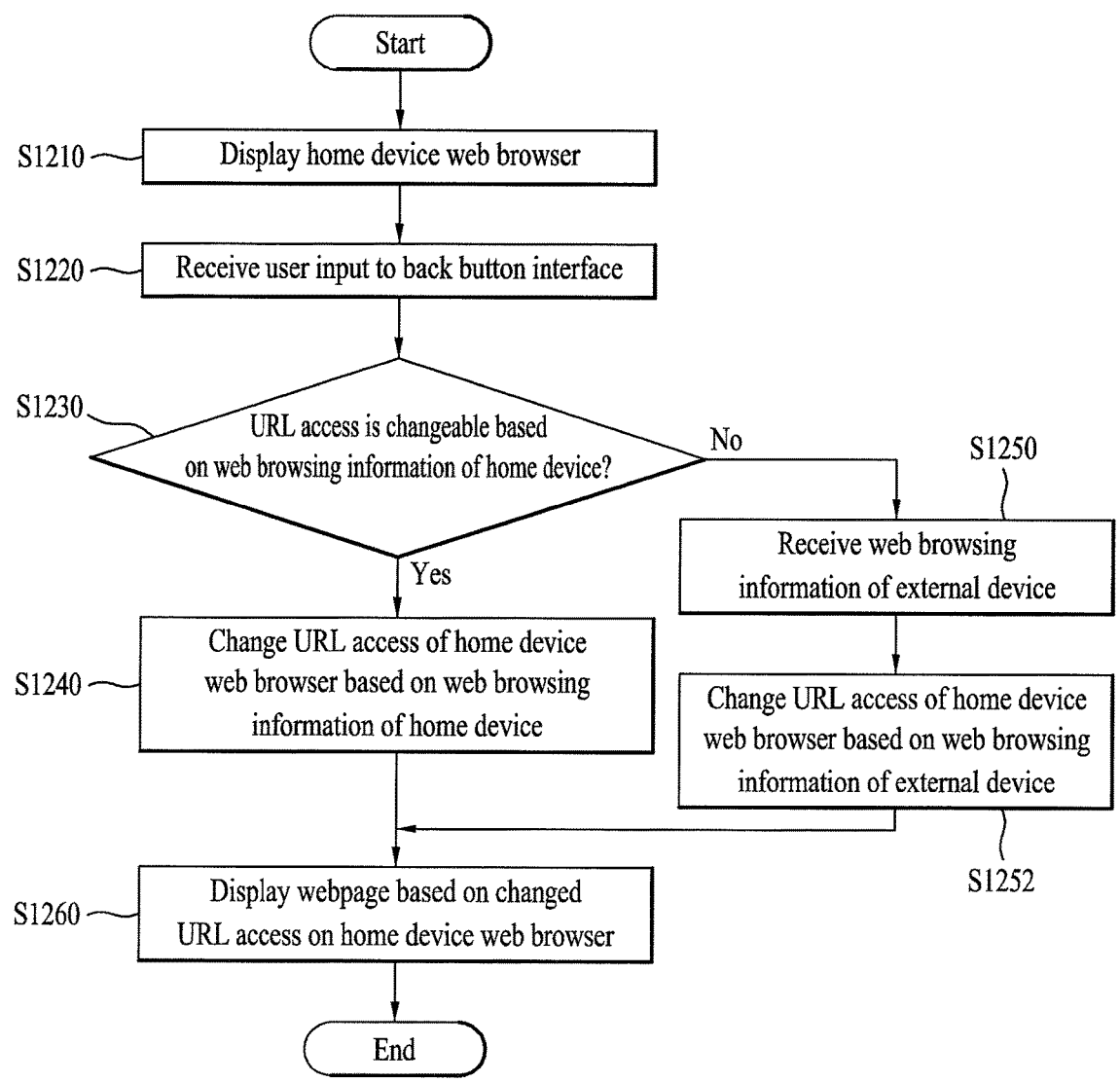

Meanwhile, according to one embodiment of the present invention, the home device web browser may be able to receive a web browsing information of at least one external device connected with the home device via network. FIG. 11 and FIG. 12 are flowcharts for a webpage providing method using a home device web browser according to another embodiment of the present invention. According to an embodiment of the present invention, the processor 11 shown in FIG. 9 may be able to control an operation of each step described with reference to FIG. 11 and FIG. 12. Details of the same or similar parts in the aforementioned embodiment shown in FIG. 10 shall be omitted in the following description with reference to FIG. 11 and FIG. 12.

Referring to FIG. 11, first of all, a home device may be able to receive a web browsing information of an external device connected with the home device via network [S1110]. According to one embodiment of the present invention, the web browsing information of the external device may be received when a home device web browser according to an embodiment of the present invention is activated. Moreover, according to another embodiment of the present invention, the web browsing information of the external device may be received before a home device web browser according to an embodiment of the present invention is activated. In order to receive the web browsing information of the external device before activating the home device web browser, the home device may be able to gather a web browsing information of an external device connected via network by predetermined time intervals. In case that a new web browsing information is generated from an external device, the external device may be able to deliver the web browsing information of the external device to the home device by real time.

Subsequently, the home device may be able to display a home device web browser [S1120]. In particular, the home device web browser may be displayed on a display unit of the home device and its detailed embodiment is identical to the step S1010 described with reference to FIG. 10. If there is the received web browsing information of the external device in the step S1110, the home device web browser may be able to activate the back button interface. In doing so, according to one embodiment of the present invention, the back button interface may have the display attribute in the $2^{nd}$ state described with reference to FIG. 8.

Subsequently, in response to a user input to the back button interface, the home device may be able to change a URL access of the home device web browser. The home device may be able to receive a user input to the back button interface [S1130]. In response to the received user input, the home device may determine whether the URL access change based on the web browsing information of the home device is available [S1140]. If the URL access change is available, the home device may change the URL access of the home device web browser based on the web browsing information of the home device [S1150]. If the URL access change is not available, the home device may change the URL access of the home device web browser based on the web browsing information of the external device [S1160]. Meanwhile, according to one embodiment of the present invention, at least two external devices connected with the home device via network may have web browsing informations, of which details are identical to those of the former embodiment described with reference to FIG. 10.

Thus, if the home device web browser performs the URL access change in response to the user input to the back button interface, the home device may be able to display a webpage based on the changed URL access change on the home device web browser [S1170].

FIG. 12 shows another embodiment of the present invention.

Referring to FIG. 12, first of all, a home device may be able to display a home device web browser [S1210]. In particular, the home device web browser may be displayed on a display unit of the home device and its detailed embodiment is identical to the step S1010 described with reference to FIG. 10.

Subsequently, in response to a user input to a back button interface, the home device may be able to change a URL access of the home device web browser. The home device may be able to receive a user input to the back button interface [S1220]. In response to the received user input, the home device may determine whether the URL access change based on the web browsing information of the home device is available [S1230]. If the URL access change is available, the home device may change the URL access of the home device web browser based on the web browsing information of the home device [S1240]. If the URL access change is not available, the home device may receive a web browsing information of an external device connected with the home device via network [S1250]. In particular, if the URL access change based on the web browsing information of the home device is not available in response to the user input to the back button interface, the home device may receive the web browsing information of the external device. Thus, if the web browsing information of the external device is received, the home device may change the URL access of the home device web browser based on the web browsing information of the external device [S1252]. Meanwhile, according to one embodiment of the present invention, at least two external devices connected with the home device via network may have web browsing informations, of which details are identical to those of the former embodiment described with reference to FIG. 10.

Thus, if the home device web browser performs the URL access change in response to the user input to the back button interface, the home device may be able to display a webpage based on the changed URL access change on the home device web browser [S1260].

According to an embodiment of the present invention, a controllable device may include one of devices controllable by being connected via network at home. In particular, the controllable device of an embodiment of the present invention may include such a device as an illumination, a door lock and the like as well as such a home appliance as a washer, a refrigerator, an oven and the like. For a means for controlling a back button interface, a touch input is taken as an example in this specification. And, the means may include one of a pointer input, speech, a gesture and the like.

Home device control functions available for an embodiment of the present invention may include various functions executable in a corresponding device as well as a home device on/off function, a home device start/end time control function and the like. For instance, in case that a target device is a TV set, a home device control function available for an embodiment of the present invention may include a play/recording function. For another instance, in case that a target device is a computer, a home device control function available for an embodiment of the present invention may include a log on/off function. For another instance, in case that a target device is an audio output device, a home device control function available for an embodiment of the present invention may include a volume control function, a radio reservation tuning function, a recording function or the like.

Accordingly, an embodiment of the present invention may be applicable to electronic devices overall or in part.

While specific embodiment of the present invention have been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method of controlling a home device web browser by a home device, the method comprising:
   displaying, by the home device, the home device web browser, the home device web browser including a back button interface for returning to a previously accessed URL (Uniform Resource Locator) of a web browser, wherein the back button interface is activated when at least one of the home device and at least one external device has the web browsing information;
   determining whether a URL access of the home device web browser is available or not in response to the user input to the back button interface;
   receiving web browsing information of at least one external device when a URL access change to a previously accessed URL of the home device is not available;
   changing, by the home device, the URL access of the home device web browser in response to a user input to the back button interface based on the web browsing information of the home device when a URL access change to a previously accessed URL of the home device is available;
   changing, by the home device, the URL access of the home device web browser in response to a user input to the back button interface based on the web browsing information of the at least one external device connected to the home device via a network when a URL access change to a previously accessed URL of the home device is not available; and
   displaying, by the home device, a webpage based on the changed URL access on the home device web browser,
   wherein the web browsing information of the at least one external device includes a URL history information according to an accessed time about a URL accessed by web browsers of the at least one external device.

2. The method of claim 1, wherein the displaying the home device web browser comprises:
   controlling the back button interface in a first state so that the back button interface guides a URL access change based on a web browsing information of the home device and the home device web browser has a first display attribute; and
   controlling the back button interface in a second state so that the back button interface guides a URL access change based on the web browsing information of the at least one external device and the home device web browser has a second display attribute different from the first display attribute, and
   wherein the web browsing information of the home device includes a URL history information about a URL accessed by the home device web browser.

3. The method of claim 2, wherein the first and second display attributes are selected from the group comprising a color, a shape, a brightness, a pattern and a transparency.

4. The method of claim 1, further comprising:
   providing a list interface for selecting one of the at least one external device in response to the user input to the back button interface,
   wherein the changing the URL access comprises changing the URL access based on the web browsing information of the external device selected via the provided list interface.

5. The method of claim 1, wherein the changing the URL access comprises:
   changing the URL access based on the web browsing information of one of the at least one external device having a latest time of executing a final URL access.

6. The method of claim 1, wherein the changing the URL access comprises:
   changing the URL access based on the web browsing information of the external device in an order of an external device having a late time of executing a final URL access from the at least one external device.

7. The method of claim 1, wherein the changing the URL access comprises:
   changing the URL access in an order of URL most recently accessed from the at least one external device based on the corresponding web browsing information.

8. The method of claim 1, wherein the receiving the web browsing information of the at least one external device comprises:
   receiving the web browsing information of the at least one external device when the home device web browser is activated.

9. The method of claim 1, wherein the receiving the web browsing information of the at least one external device comprises:

receiving the web browsing information of the at least one external device in response to the user input to the back button interface.

10. A home device, comprising:
a communication unit configured to transmit/receive data to/from at least one external device connected to the home device via a network;
a processor configured to control an operation of the home device; and
a display unit configured to output an image based on a command from the processor,
wherein the processor is further configured to
control the display unit to display a home device web browser, the home device web browser including a back button interface for returning to a previously accessed URL (Uniform Resource Locator) of a web browser, wherein the back button interface is activated when at least one of the home device and at least one external device has the web browsing information,
determine whether a URL access of the home device web browser is available or not in response to the user input to the back button interface,
receive web browsing information of the at least one external device when a URL access change to a previously accessed URL of the home device is not available,
change the URL access of the home device web browser in response to a user input to the back button interface based on the web browsing information of the home device when a URL access change to a previously accessed URL of the home device is available,
change the URL access of the home device web browser in response to a user input to the back button interface based on the web browsing information of the at least one external device connected with the home device via the network when a URL access change to a previously accessed URL of the home device is not available, and
control the home device web browser to display a webpage based on the changed URL access, and
wherein the web browsing information of the at least one external device includes a URL history information according to an accessed time about a URL accessed by web browsers of the at least one external device.

11. The home device of claim 10, wherein the processor is configured to
control the back button interface in a first state so that the back button interface guides a URL access change based on a web browsing information of the home device and the home device web browser has a first display attribute, and
control the back button interface in a second state so that the back button interface guides a URL access change based on the web browsing information of the at least one external device and the home device web browser has a second display attribute different from the first display attribute, and
wherein the web browsing information of the home device includes a URL history information about a URL accessed by the home device web browser.

12. The home device of claim 11, wherein the first and second display attributes are selected from the group comprising a color, a shape, a brightness, a pattern and a transparency.

13. The home device of claim 10, wherein the processor is configured to
provide a list interface for selecting one of the at least one external device in response to the user input to the back button interface, and
change the URL access based on the web browsing information of the external device selected via the provided list interface.

14. The home device of claim 10, wherein the processor is configured to
change the URL access based on the web browsing information of one of the at least one external device having a latest time of executing a final URL access.

15. The home device of claim 10, wherein the processor is configured to
change the URL access based on the web browsing information of the external device in an order of an external device having a late time of executing a final URL access from the at least one external device.

16. The home device of claim 10, wherein the processor is configured to
change the URL access in an order of URL most recently accessed from the at least one external device based on the corresponding web browsing information.

17. The home device of claim 10, wherein the processor is configured to receive the web browsing information of the at least one external device when the home device web browser is activated.

18. The home device of claim 10, wherein the processor is configured to receive the web browsing information of the at least one external device in response to the user input to the back button interface.

* * * * *